Aug. 4, 1931.    H. F. FLOWERS    1,817,681
DUMP VEHICLE
Filed Nov. 10, 1927    3 Sheets-Sheet 1

Aug. 4, 1931.  H. F. FLOWERS  1,817,681
DUMP VEHICLE
Filed Nov. 10, 1927   3 Sheets-Sheet 2

Inventor
Henry Fort Flowers
By Sturtevant & Mason
Attorneys

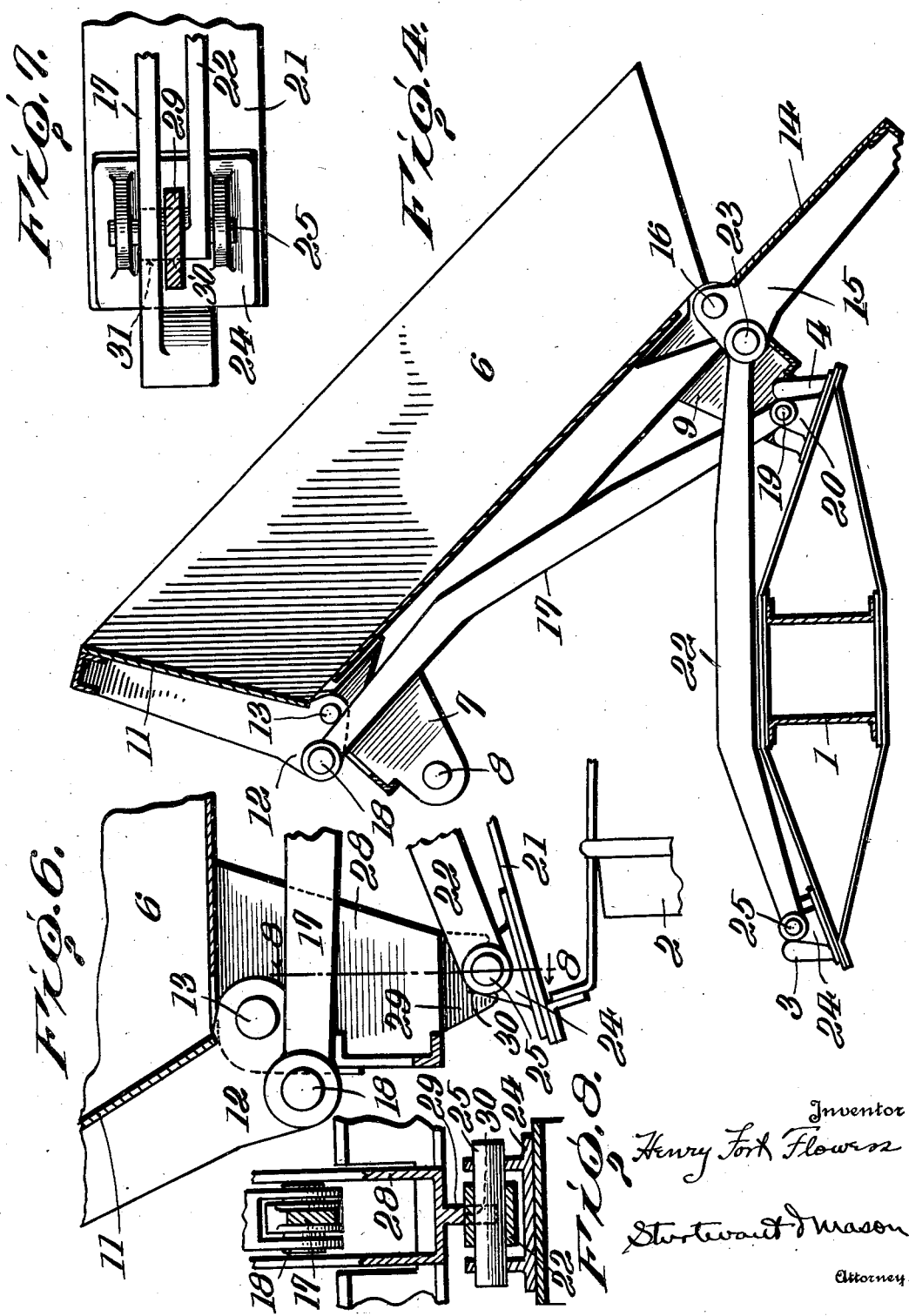

Patented Aug. 4, 1931

1,817,681

UNITED STATES PATENT OFFICE

HENRY FORT FLOWERS, OF FINDLAY, OHIO

DUMP VEHICLE

Application filed November 10, 1927. Serial No. 232,340.

The invention relates to new and useful improvements in dump vehicles for road and rail use, and more particularly to a dump vehicle wherein the body is tiltable about fulcrums at opposite sides of an under frame.

An object of the invention is to provide a dump vehicle of the above type having down-folding doors at each side thereof, with a door controlling means for each door which is very simple in construction and composed of few parts, which door controlling mechanism operates to positively hold the doors closed during transit, to open and close the door at the dumping side through the action of the tilting of the body, and at the same time to positively maintain the door closed at the side opposite dumping during such tilting of the body.

In the drawings which show by way of illustration one embodiment of the invention—

Figure 1:
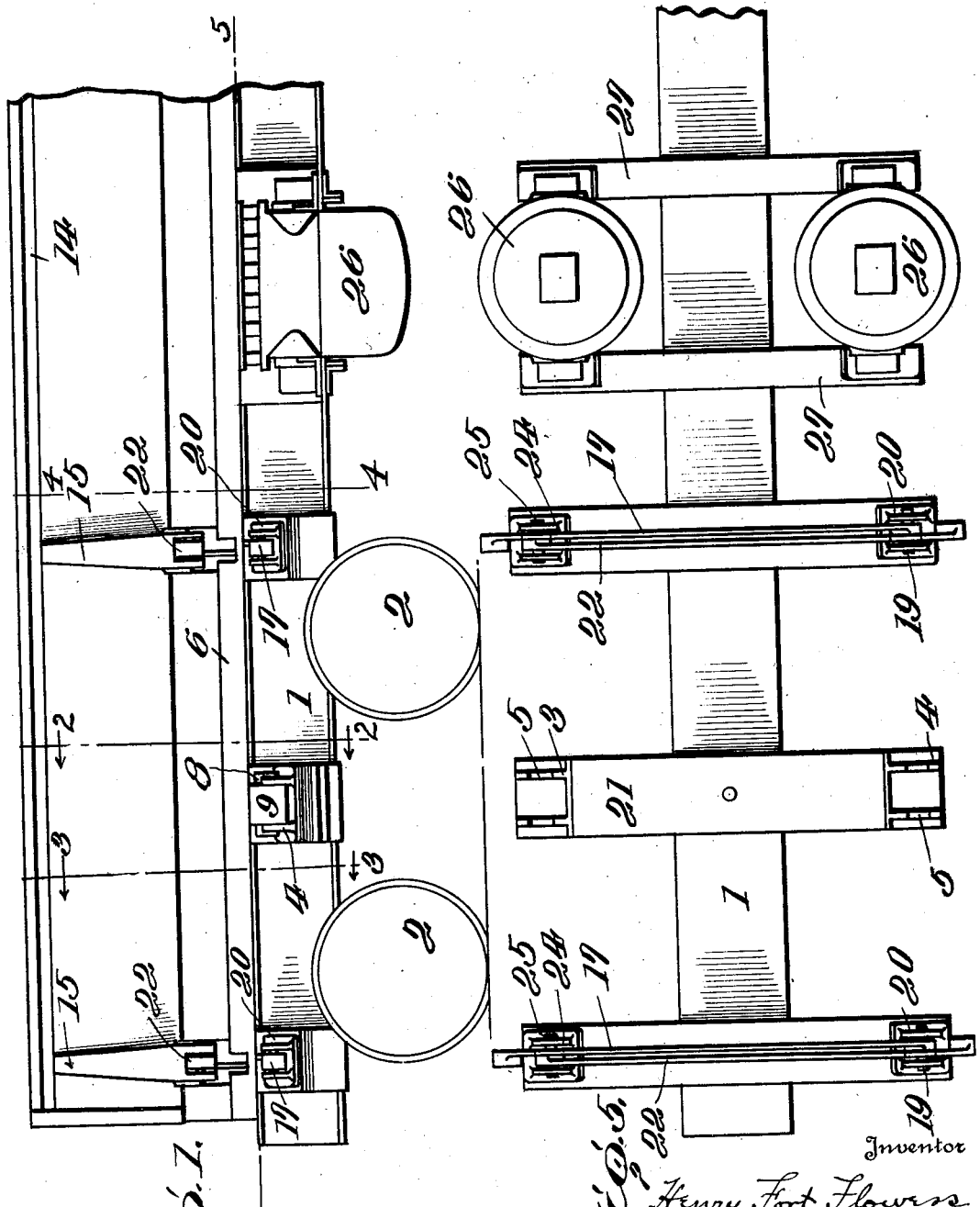
Figure 1 is a view, more or less diagrammatic, showing in side elevation a portion of a vehicle containing the improvements.
Figure 3:
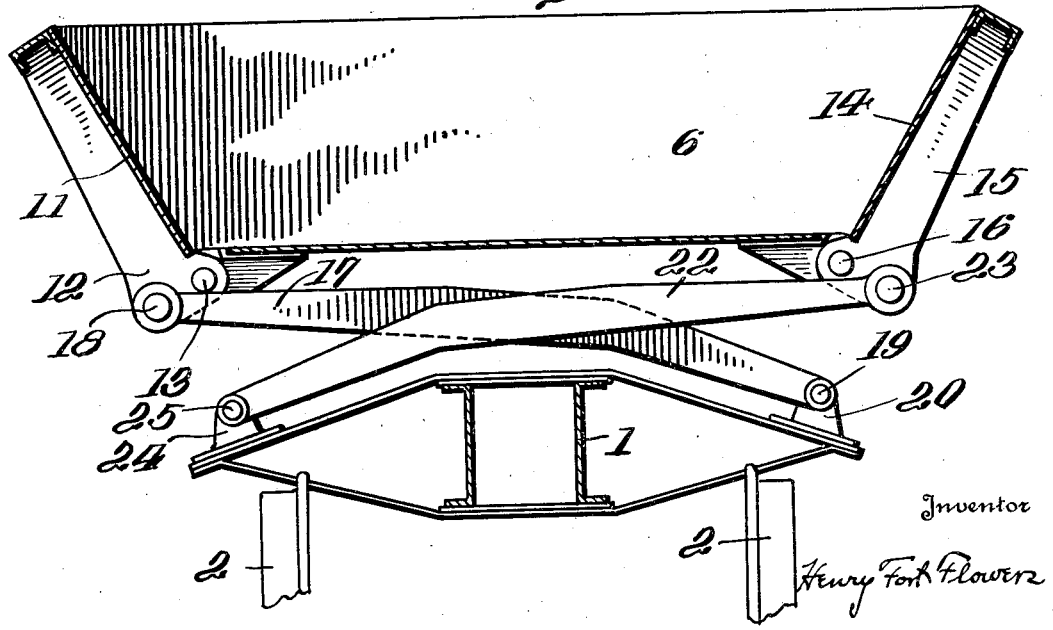
Fig. 3 is a view more or less diagrammatic, and in part in section on the line 3—3 of Fig. 1.

Fig. 4 is a view similar to Fig. 3, but showing the body tiltable for dumping at one side;

Fig. 5 is a view more or less diagrammatic on the line 5—5 of Fig. 1;

Fig. 6 is a detail in side elevation showing a slightly modified form of supporting means for the body;

Fig. 7 is a view partly in plan and partly in section of the modified form of support, and Fig. 8 is a sectional view on the line 8—8 of Fig. 6.

The invention is directed to a dump vehicle of the type shown in my prior application Serial No. 66,791, filed November 4, 1925, although it is equally applicable to a dump vehicle of the type shown in my prior Patent No. 1,611,012, granted December 14, 1926.

The essential features of the dump vehicle include an under frame on which the body is mounted so that it is tiltable about fulcrums at opposite sides of the under frame. At each side of the body is a down-folding door which is pivotally supported by the body. Power mechanism is provided for tilting the body on its selected fulcrum, and a door controlling mechanism is provided for controlling the doors. The invention is directed particularly to this door controlling mechanism, and consists of a series of links for each door. The links for controlling the doors at one side of the body are pivotally connected to the doors by the hinges forming a part of the doors, on a line at one side of its pivotal axis. These links all extend across to the other side of the under frame and are connected thereto substantially at the fulcrum line for the body. The controlling links for the other door are similarly constructed and are entirely independent in their action of the controlling links for the door just described.

Figure 2:
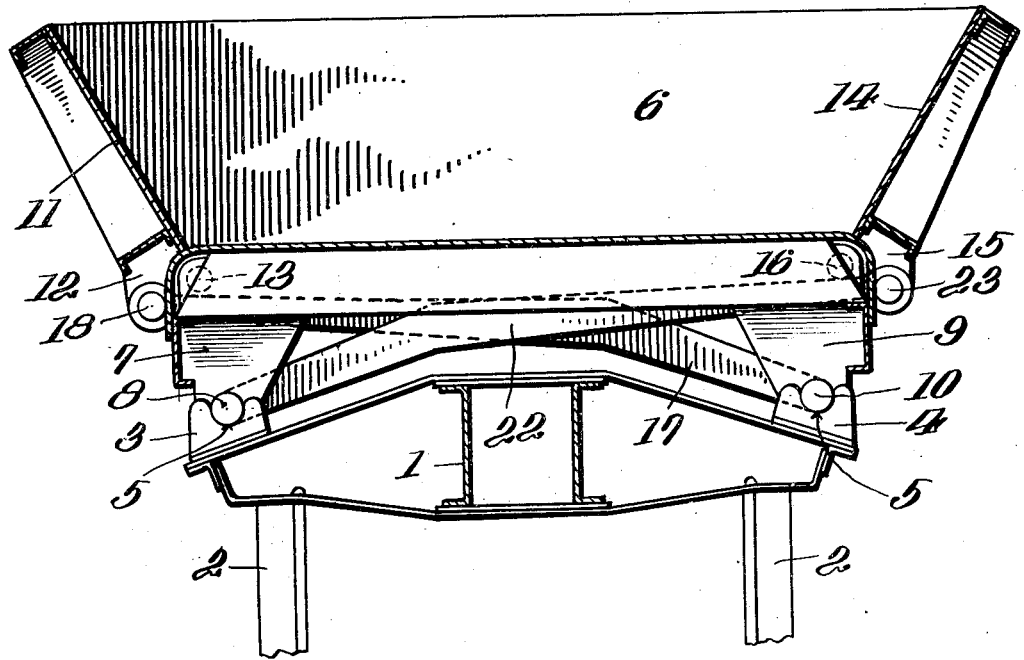
Fig. 2 is a view more or less diagrammatic and in part in section on the line 2—2 of Fig. 1.

Referring more in detail to the drawings, the dump vehicle includes an under frame 1, which as shown in Fig. 2, is mounted on rail wheels 2, 2 in any desired manner. This under frame is provided with a series of fulcrum blocks 3, 3 along one side of the frame, and a series of fulcrum blocks 4—4 along the other side of the frame. Each fulcrum block is provided with a seat 5. The seats of the fulcrum blocks 3 are all in a line, and the seats of the fulcrum blocks 4 are also in a line. Mounted on this under frame is a body 6. The body is provided with a series of brackets 7, 7 along one side thereof, and each bracket is in turn provided with a trunnion 8 adapted to rest in the seats of the fulcrum blocks 3 when the vehicle is in transit. Along the other side of the body is a series of brackets 9, each of which is provided with a trunnion 10 adapted to rest in the seats of the fulcrum blocks 4 when the vehicle is in transit.

Pivoted to the body at one side thereof is a door 11. Said door is provided with a series of hinge members 12 rigidly secured thereto. Each hinge member is pivoted at 13 to the body. The pivot points 13 of the hinge members are all in a line, and this is an axial line around which the door may swing in its opening and closing movement. As shown in the drawings, the body is provided with an outwardly inclined end wall, and the doors, when in closed position, are inclined to the vertical as shown in Fig. 2 of the drawings. At the other side of the body 6 is a door 14 which is likewise provided with hinge members 15 pivoted at 16 to the body. The pivot points 16 are likewise in a line, and this forms an axial line around which the door 14 swings during its opening and closing movement. Underneath the body and above the under frame is a series of links 17 which control the door 11. Each link 17 is pivoted at 18 to the door hinge 12. This link extends across the under frame, and is pivoted at 19 to a bracket 20 attached to the under frame (see Fig. 5). The under frame has transversely extending arms which support these brackets 20. The pivots 19 for the links 17 are all in a line, and this line is substantially coincident with a line containing the centers of the seats of the fulcrum blocks 4. The under frame is provided with a bolster 21 on which these fulcrum blocks 3 and 4 are mounted (see Fig. 5), and it will be apparent from this figure of the drawings, that these pivot points 19 are in alinement with the seats in the fulcrum blocks 4.

A series of links 22 are pivoted at 23 to the door hinges 15 of the door 14. These pivotal connections 23 between the links and the door hinges are all in a line, and this line is at one side of the axial line about which the door may swing relative to the body. The same is true of the pivotal connections 18. They are in a line at one side of the axial line about which the door 11 swings relative to the body. The links 22 all extend across the other side of the under frame. These links 22 are pivotally connected to brackets 24 at the other end of the transverse arms on the under frame which carry the brackets 20. The links 22 are pivoted at 25. The pivot points 25 of the links controlling the door 14, are in a line substantially coincident with the line containing the centers of the seats of the fulcrum blocks 3.

When the body is in normal position for transit, as shown in Figures 2 and 3, the trunnions rest in the seats in the fulcrum blocks. These fulcrums are widely spaced, and are, as a matter of fact, at the extreme sides of the under frame and in vertical planes, near the plane containing the rail wheels. By the use of these widely spaced fulcrums for supporting the body on the under frame, no latches whatever are necessary to hold the body from tilting during transit. Power means is provided for tilting the body, as is desirable in a type of vehicle where the fulcrums are so widely spaced. This power means, as shown in Figures 1 and 5, includes operating cylinders 26, 26 having trunnions which are mounted in transverse supports 27, 27. Each power cylinder is provided with its piston and piston rod, and the piston rods are in turn connected to the body, so that when an operating fluid is supplied to one of said power cylinders, the vehicle body will be tilted about one of its fulcrums, and when the operating fluid is supplied to the other power cylinder, then the vehicle body will be tilted about its other fulcrum. During transit, the doors are held closed by the links which are connected to the doors and the under frame. The links are positively connected to the door hinges, and they are also positively connected to the under frame, and the links are so arranged and proportioned that when the body rests on these trunnions for transit, the doors are in closed position, and neither door can move until the body tilts relative to the under frame. When the body tilts relative to the under frame so as to dump at the right as viewed in Fig. 4, the links 17 which are pivoted to the under frame along a line substantially coincident with the fulcrum line, will merely swing on their pivots, remaining in their fixed position relative to the body. Inasmuch as all points of the body are swinging about this fulcrum at the right, the door pivot and the pivotal connection between the link and the door hinge likewise are all swinging about the same center, and therefore, the door 11 at the left of the vehicle body is positively held closed by the links connected thereto. The door at the dumping side of the body, however, is positively moved to open position while the body is tilting to position for dumping. This is brought about by the reason that the pivot point of the door 14 moves in the arc of a circle about the fulcrum line of the fulcrum blocks 4 as a center. At the same time, the pivotal connections 23 between the door hinges and the links 22 will swing in the arc of a circle, the center of which is the pivotal connection of the links 22 to the under frame. This gives a differential movement to the pivotal point 23 between the link and the door hinge, and the pivotal point 16 between the door and the body, and as a result, the door will be positively drawn open to the position shown in Fig. 4. It will be noted that the body is suspended a sufficient distance above the under frame, so that the links 22 can move down to a position closer to the under frame, and the movement of the link about its pivot at the opposite side of the vehicle from the door which is opening and closing, will not in any way be interfered with. When the body is returned to horizontal position for transit, then again, a differential movement of the pivot points just mentioned, will cause the door to be positively closed.

From the above it will be apparent that I have provided a dump vehicle wherein the body is tiltable about fulcrums at opposite sides of the under frame, and down-folding doors pivotally supported by the body are controlled solely by the use of links pivotally connected to the door hinge and to the under frame. The body really operates through the links to control the doors, and when there is no movement of the body on its fulcrums during transit, the body operates through said links to hold the doors closed, for the doors are at this time in closed position. When the body tilts about the fulcrum at one side of the vehicle, the links controlling the door at the opposite side of the vehicle, swing about such fulcrum line, thus maintaining their position relative to the body, so as to maintain the doors opposite dumping closed. At the same time, when the body tilts so as to bring about a differential movement or position of the pivot of the door to the pivot of the link to the door, then the door is positively opened as the body slowly tilts to full dumping position, and is positively closed when the body returns to its horizontal position after dumping.

It will be noted from the above description that I have provided a door controlling mechanism which is entirely free from latches. Also a body supporting mechanism which is entirely free from latches. There is no possible chance of the body accidentally tilting during transit, and bringing about the premature dumping of the contents thereof. Furthermore, by the mechanism above described, it will be apparent that the power cylinders for bringing about a tilting of the body relative to the under frame of a vehicle can be controlled at a distance, and it is not necessary to operate any latches at the particular vehicle which is being dumped.

It will be understood, of course, that I have used the term "vehicle" as covering any type of transporting device wherein there is a body carried by the under frame which in turn is mounted on wheels so that it can be moved about. The invention, however, is particularly adapted for a vehicle operating on rails, for the reason that a series of such vehicles can be joined in a train, and any vehicle in the entire train can be controlled from a single station whenever desired. Furthermore, in the type of vehicle which has been described where the fulcrums are widely spaced, the dumping takes place well to one side of the supporting wheels for the vehicle, and thus the material which is dumped is discharged well to one side of the tracks on which the vehicles travel.

In Figures 6, 7 and 8, I have shown a slightly modified form of supporting means for the body. In this form of the invention, I have combined the bolsters and the arms to which the links are pivoted. The bracket member 28 attached to the body and to which the door hinges are connected are extended downward and provided with a central web 29 which is formed with a seat or pocket 30. The bracket 24 to which the link 22 is pivoted is provided with upstanding members through which the rod passes for forming the pivot 25. The link 22 has a laterally extending sleeve 31 attached thereto, and the pivot rod 25 extends through said sleeve, thus connecting the link 22 to the bracket 24. The seat 30 in the bracket member 28 attached to the body, is fitted to engage the sleeve 31 on the rod 25. This sleeve becomes the fulcrum about which the car body tilts at the left of the car as viewed in Fig. 6. The parts are similarly constructed at the other side of the car, and neither showing or further description thereof is thought necessary.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A dump vehicle comprising an under frame, a body tiltable about fulcrums at opposite sides of the under frame, a down-folding door at each side of said body pivotally supported thereby, and door controlling means for each door including links free of connection with the body and pivotally connected to the door at a line at one side of its pivotal axis and extending across the under frame and connected thereto substantially at the opposite side fulcrum line for the body whereby said links during transit positively hold said doors closed, and during dumping open and close the door at the side of dumping and maintain the door at the opposite side closed.

2. A dump vehicle comprising an under frame, supporting wheels therefor, said under frame having bolsters extending transversely thereof and near the supporting wheels, each bolster having a fulcrum block at the outer end thereof, a body having trunnions adapted to engage the fulcrum blocks, whereby said body is tiltable about said fulcrums at either side of the under frame, a down-folding door at each side of said body pivotally supported thereby, and door controlling means for each door including links free of connection with the body and pivotally connected to the door at a line at one side of its pivotal axis and extending across the under frame and connected thereto substantially at the opposite side fulcrum line for the body.

3. A dump vehicle comprising an under frame, a body tiltable about fulcrums at opposite sides of the under frame, power cylinders mounted on the under frame and connected to the body for lifting the body so as to tilt the same about the fulcrums at either side of the under frame, a down-folding door at each side of said body pivotally supported thereby, and door controlling means for each door including links free of connection with the body and pivotally connected to the door at the line at one side of its pivotal axis and extending across the under frame and connected thereto substantially at the opposite side fulcrum line for the body.

4. A dump vehicle comprising an under frame having transversely extending bolsters, fulcrum blocks at the outer ends of said bolsters, a body, brackets located at the outer sides of said body and having trunnions adapted to engage, respectively, with the fulcrum blocks, a down-folding door at each side of said body pivotally supported thereby, a series of links free of connection with the body and pivotally connected to the door at a line at one side of the body at a line at one side of the pivotal axis of the door and extending across said body and pivotally connected to brackets mounted at the outer ends of arms forming a part of said under frame, said pivotal connection to the brackets being substantially in line with the fulcrum line of the body on the under frame at that side of the under frame, a series of links free of connection with the body and pivotally connected to the other door at a line at one side of its pivotal axis and extending across the under frame to the other side thereof and pivotally connected to brackets carried by arms forming a part of the under frame, said pivotal connection to said brackets being substantially in line with the fulcrum line of the body at that side of the under frame.

5. A dump vehicle comprising a frame, a body tiltable about fulcrums at opposite sides of the under frame, a down folding door at each side of said body pivotally supported thereby, and a door controlling mechanism for each door including means free of connection with the body connected to the door at a line at one side of its pivotal axis and extending across the under frame and connected thereto substantially at the opposite side fulcrum line for said body whereby said means during transit positively hold said doors closed and during dumping open and close the door at the side of dumping and maintain the door at the opposite side closed.

In testimony whereof, I affix my signature.

HENRY FORT FLOWERS.